(12) United States Patent
Golan et al.

(10) Patent No.: US 9,516,162 B2
(45) Date of Patent: Dec. 6, 2016

(54) SYSTEM AND METHOD FOR ON-DEMAND PRESENCE

(71) Applicant: Vonage Business Inc., Atlanta, GA (US)

(72) Inventors: Yuval Golan, Rishon le-Zion (IL); Gil Osher, Tel-Aviv (IL)

(73) Assignee: Vonage Business Inc., Atanta, GA (US)

( * ) Notice: Subject to any disclaimer, the term of this patent is extended or adjusted under 35 U.S.C. 154(b) by 0 days.

(21) Appl. No.: 14/526,941

(22) Filed: Oct. 29, 2014

(65) Prior Publication Data

US 2016/0127550 A1    May 5, 2016

(51) Int. Cl.
*H04M 3/42* (2006.01)
*H04W 4/16* (2009.01)

(52) U.S. Cl.
CPC .......... *H04M 3/42374* (2013.01); *H04W 4/16* (2013.01)

(58) Field of Classification Search
CPC ............. H04M 3/42; H04M 3/42093; H04M 3/42365; H04M 3/42374; H04W 4/16
See application file for complete search history.

(56) References Cited

U.S. PATENT DOCUMENTS

| | | | | |
|---|---|---|---|---|
| 8,774,773 B1* | 7/2014 | Sigmund | ........... | H04M 3/42365 379/201.1 |
| 8,831,574 B2* | 9/2014 | Corbett | ............. | H04M 3/42348 455/413 |
| 9,179,277 B2* | 11/2015 | Kerger | ..................... | H04W 4/16 |
| 2003/0112948 A1* | 6/2003 | Brown | .............. | H04M 3/42008 379/207.04 |
| 2006/0003745 A1* | 1/2006 | Gogic | ............... | H04M 1/72547 455/413 |
| 2007/0121829 A1* | 5/2007 | Tal | ..................... | H04M 3/42195 379/93.09 |
| 2008/0095344 A1* | 4/2008 | Jachner | ................... | H04L 67/24 379/133 |
| 2009/0238352 A1* | 9/2009 | Suzuki | .............. | H04M 3/42365 379/142.04 |
| 2013/0028144 A1* | 1/2013 | Goodman | ............... | H04L 12/66 370/259 |
| 2013/0078971 A1* | 3/2013 | Trandal | ................... | H04W 4/16 455/414.1 |
| 2013/0217364 A1* | 8/2013 | Varoglu | .................. | H04L 67/24 455/414.1 |
| 2014/0267543 A1* | 9/2014 | Kerger | ................ | H04W 76/005 348/14.02 |
| 2015/0050920 A1* | 2/2015 | Morris | .................... | H04W 4/16 455/414.1 |
| 2015/0264182 A1* | 9/2015 | Mahajan | ................. | H04M 3/54 455/413 |

* cited by examiner

*Primary Examiner* — Christopher M Brandt
(74) *Attorney, Agent, or Firm* — Moser Taboada; Joseph Pagnotta

(57) ABSTRACT

Methods and systems for determining availability of a user based on mobile device status are provided herein. In some embodiments, a method for determining availability of a user based on mobile device status may include receiving, at a first device, an instruction to check a status of a second device; transmitting a status request from the first device to the second device; and receiving, responsive to the status request, a message from the second device indicating a telephony status of the second device.

14 Claims, 5 Drawing Sheets

SYSTEM AND METHOD FOR ON-DEMAND PRESENCE

BACKGROUND

Field

Embodiments of the present invention generally relate to systems and methods for determining availability of a user based on mobile device status.

Description of the Related Art

Mobile users may be billed for calls that go unanswered or are otherwise uncompleted. As such, before placing a call to a mobile user, a caller may wish to know whether the user is available. More specifically, the caller may wish to know if the mobile user they wish to call (i.e., the callee) is busy on another call. Currently, to determine a user's presence, the status of a user's mobile device, for example the callee's device, is sent to a server and stored on the server. If another user wishes to connect with the callee device, the callee device status is sent to requesting party from the server. This typically requires an active server that registers devices and that monitors the status of devices. The use of an intermediary server requires more resources and takes more time that if the devices were able to directly obtain a status from each other.

Thus, there is a need for improved peer-to-peer systems and methods for determining availability of a user based on mobile device status.

SUMMARY

Methods and systems for determining availability of a user based on mobile device status are provided herein. In some embodiments, a method for determining the availability of a user based on mobile device status may include receiving, at a first device, an instruction to check a status of a second device; transmitting a status request from the first device to the second device; and receiving, responsive to the status request, a message from the second device indicating a telephony status of the second device.

In some embodiments, a method for providing a mobile device status, may include receiving a status request from a first device; retrieving a telephony status for the device; and transmitting the telephony status to the first device.

In some embodiments, a system for determining the availability of a user based on mobile device status may include a status request module configured to receive, at a first device, an instruction to check a status of a second device; a communication module configured to transmit a status request from the first device to the second device; and a notification module configured to receive, responsive to the status request, a message from the second device indicating a telephony status of the second device.

In some embodiments, a system for providing a mobile device status may include a status retrieval module configured to receive a status request from a first device; and retrieve a telephony status for the device.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
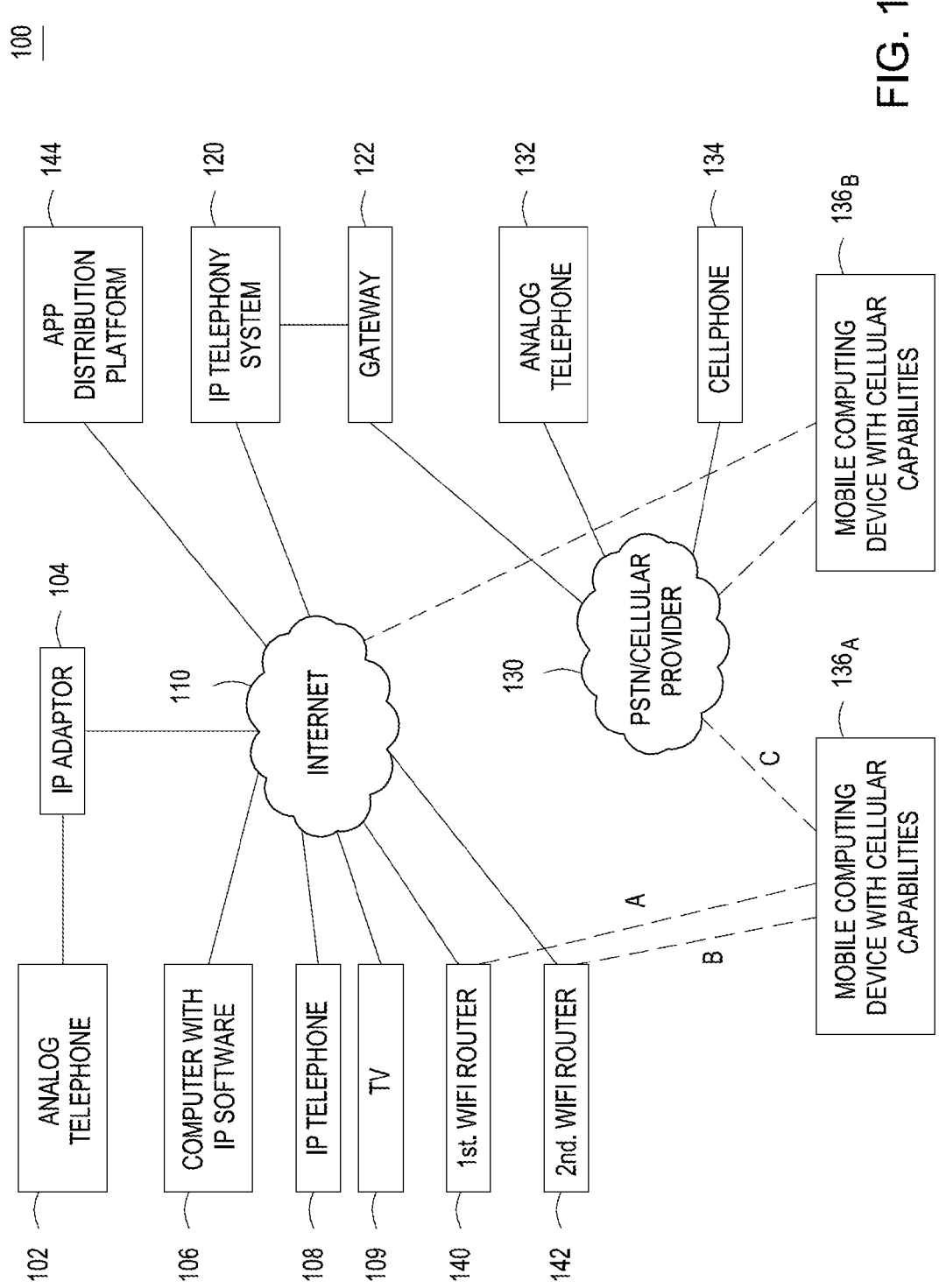
FIG. 1 depicts a block diagram of a telecommunication network, according to one or more embodiments of the invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention generally relate to systems and methods for determining the availability of a user based on the user's mobile device status. More specifically, embodiments of the present invention enable a user of a first mobile device to send a status request message to a second mobile device. The second mobile device determines the state of the mobile device either from a mobile app on the device or via operating system Application Programming Interfaces (APIs). The status, whether the user is free, on a call, and the like, is sent back to the first mobile device. In the event the second user device is busy (e.g., on a call), when the second user device is free, a notification is sent to the first user device indicating the change in status. In some embodiments, the first user device may perform a set of actions based on the returned response from the second user device. For example, if the received status indicates the user of the second device is on a call, the first user device may only have the ability to text the user until a notification is received indicating that the second user device is free.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the following description, the terms VOIP system, VOIP telephony system, IP system and IP telephony system are all intended to refer to a system that connects callers and that delivers data, text and video communications using Internet protocol data communications. Those of ordinary skill in the art will recognize that embodiments of the present invention are not limited to use with IP telephony systems and may also be used in other systems.

As illustrated in FIG. 1, a communications environment 100 is provided to facilitate IP enhanced communications. An IP telephony system 120 enables connection of telephone calls between its own customers and other parties via data communications that pass over a data network 110. The data network 110 is commonly the Internet, although the IP telephony system 120 may also make use of private data networks. The IP telephony system 120 is connected to the Internet 110. In addition, the IP telephony system 120 is connected to a publicly switched telephone network (PSTN) 130 via a gateway 122. The PSTN 130 may also be directly coupled to the Internet 110 through one of its own internal gateways (not shown). Thus, communications may pass back and forth between the IP telephony system 120 and the PSTN 130 through the Internet 110 via a gateway maintained within the PSTN 130.

The gateway 122 allows users and devices that are connected to the PSTN 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize a packet-switched network of a cellular telephone system to access the Internet 110.

Alternatively, a customer could utilize an analog telephone 102 which is connected to the Internet 110 via a telephone adapter 104. The telephone adapter 104 converts analog signals from the telephone 102 into data signals that pass over the Internet 110, and vice versa. Analog telephone devices include but are not limited to standard telephones and document imaging devices such as facsimile machines. A configuration using a telephone adapter 104 is common where the analog telephone 102 is located in a residence or business. Other configurations are also possible where multiple analog telephones share access through the same IP adaptor. In those situations, all analog telephones could share the same telephone number, or multiple communication lines (e.g., additional telephone numbers) may be provisioned by the IP telephony system 120.

In addition, a customer could utilize a soft-phone client running on a computer 106 or a television 109 to place and receive IP based telephone calls, and to access other IP telephony systems (not shown). The computer 106 may be a personal computer (PC), a tablet device, a gaming system, and the like. In some instances, the soft-phone client could be assigned its own telephone number. In other instances, the soft-phone client could be associated with a telephone number that is also assigned to an IP telephone 108, or to a telephone adaptor 104 that is connected one or more analog telephones 102.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 then routes the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In the following description, references will be made to an "IP telephony device." This term is used to refer to any type of device which is capable of interacting with an IP telephony system to complete an audio or video telephone call or to send and receive text messages, and other forms of communications. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone that can facilitate voice based session calls, and an IP telephone that can facilitate data based session calls.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device, such as the APPLE IPHONE, that includes both cellular telephone capabilities and a wireless data transceiver that can establish a wireless data connection to a data network. Such a mobile computing device could run appropriate application software to conduct VoIP telephone calls via a wireless data connection. Thus, a mobile computing device, such as an APPLE IPHONE, a RIM BLACKBERRY or a comparable device running GOOGLE ANDROID operating system could be a mobile telephony device.

In still other instances, a mobile telephony device may be a device that is not traditionally used as a telephony device, but which includes a wireless data transceiver that can establish a wireless data connection to a data network. Examples of such devices include the APPLE IPOD TOUCH and the IPAD. Such a device may act as a mobile telephony device once it is configured with appropriate application software.

FIG. 1 illustrates that a mobile computing device with cellular capabilities 136A (e.g., a smartphone) is capable of establishing a first wireless data connection A with a first wireless access point 140, such as a wireless local area network (WLAN) router. The first wireless access point 140 is coupled to the Internet 110. Thus, the mobile computing device 136A can establish a VOIP telephone call with the IP telephony system 120 via a path through the Internet 110 and the first wireless access point 140.

FIG. 1 also illustrates that the mobile computing device 136A can establish a second wireless data connection B with a second wireless access point 142 that is also coupled to the Internet 110. Further, the mobile computing device 136A can establish either a third wireless data connection C via a packet-switch network provided by a cellular service provider 130 using its cellular telephone capabilities, or establish a voice based session telephone call via a circuit-switched network provided by a cellular service provider 130. The mobile computing device 136A could also establish a VoIP telephone call with the IP telephony system 120 via the second wireless connection B or the third wireless connection C.

Although not illustrated in FIG. 1, the mobile computing device 136A may be capable of establishing a wireless data connection to a data network, such as the Internet 110, via alternate means. For example, the mobile computing device 136A might link to some other type of wireless interface using an alternate communication protocol, such as the wireless local area network (WLAN) based on the Institute of Electrical and Electronics Engineers' (IEEE) 802.11 and 802.13 standards.

Similarly, mobile computing device with cellular capabilities 136B may also be coupled to internet 110 and/or cellular service provider 130. In some embodiments, mobile computing device 136B may be connected to internet 110 via a wireless local area network (WLAN) based on the Institute of Electrical and Electronics Engineers' (IEEE) 802.11 and 802.13 standard connection, and the like, and can also establish a VOIP telephone calls with the IP telephony system 120 similar to mobile computing device 136A. In embodiments of the present invention, communications environment 100 may be used to establish voice based or data based telecommunications sessions between mobile computing device 136A and mobile computing device 136B, depending on various criteria associated with each of the mobile computing devices, as will be described below in more detail.

In the embodiments described above, a device may act as a mobile telephony device once it is configured with appropriate application software that may be downloaded from an app distribution platform 144. For example, mobile computing device 136A may download a VOIP mobile app from app distribution platform 144 and install the VOIP mobile app on mobile computing device 136A.

Figure 2:
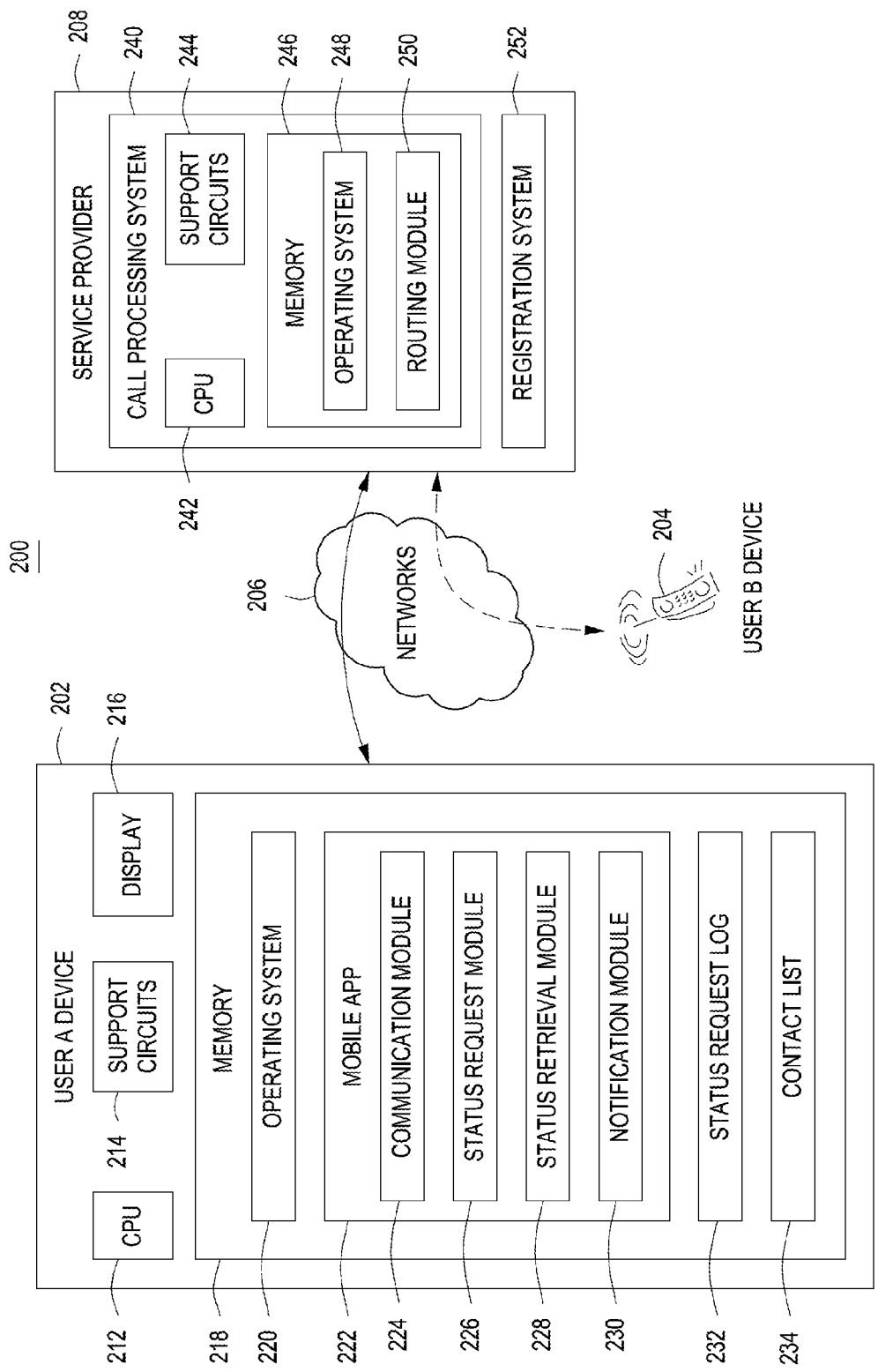
FIG. 2 depicts a block diagram of a system for determining availability of a user based on mobile device status, according to one or more embodiments of the invention.

FIG. 2 depicts a block diagram of a system 200 for determining the availability of a user based on mobile device status in accordance with embodiments presented herein. The system 200 includes at least one telecommunication service provider 208 that can provide telecommunication services to a plurality of end-user devices (e.g., such as user A device 202 and user B device 204) via one or more networks 206. Devices 202 and 204 may include analog phone 102, a computer with IP software 106, IP telephone 108, and/or mobile computing device with cellular capabilities 136A, 136B, and the like, as shown in FIG. 1. The telecommunication service provider 208 may include IP telephone system 120 that facilitates on-net calls between user A device 202 and user B device 204.

The end-user devices (e.g., user A device 202 and user B device 204) comprise a Central Processing Unit (CPU) 212, support circuits 214, display 216, and memory 218. The CPU 212 may comprise one or more commercially available microprocessors or microcontrollers that facilitate data processing and storage. The various support circuits 214 facilitate the operation of the CPU 212 and include one or more clock circuits, power supplies, cache, input/output circuits, and the like. The memory 218 comprises at least one of Read Only Memory (ROM), Random Access Memory (RAM), disk drive storage, optical storage, removable storage and/or the like. In some embodiments, the memory 218 comprises an operating system (OS) 220, a mobile app 222, a status request log 232, and a contact list 234. The status request log 232 includes information regarding each user device from which a status request was received while the mobile device was busy (e.g., on a call). The contact list 234 may be used to select a user whose status is to be requested.

The mobile app 222 may be a VoIP mobile telecommunications application provided by, or otherwise associated with, telecommunication service provider 208. The mobile app 222 may be downloaded from app distribution platform 144 and installed on user A device 202 and user B device 204. The mobile app 222 includes a communication module 224, a status request module 226, a status retrieval module 228, and a notification module 230. The communication module 224 is designed to provide telecommunication services to the device. The status request module 226 is designed to generate a status request to a mobile device. The status retrieval module 228 is designed to determine the status of a device, either by retrieving the status from the mobile app 222, or using operating system APIs. The notification module 230 is designed to generate a notification message if a status request was received while the mobile device was busy (e.g., on a call). The notification message informs the initiator of the status request that the mobile device is no longer busy and call may be placed to the device.

The operating system (OS) 220 generally manages various computer resources (e.g., network resources, file processors, and/or the like). The operating system 220 is configured to execute operations on one or more hardware and/or software modules, such as Network Interface Cards (NICs), hard disks, virtualization layers, firewalls and/or the like. Examples of the operating system 220 may include, but are not limited to, LINUX, MAC OSX, BSD, UNIX, MICROSOFT WINDOWS, IOS, ANDROID and the like.

The telecommunication service provider 208 may be a VoIP service provider network and includes a call processing system 240 and a registration system 252. In some embodiments, the call processing system 240 comprises a Central Processing Unit (CPU) 242, support circuits 244, and memory 246. The CPU 242 may comprise one or more commercially available microprocessors or microcontrollers that facilitate data processing and storage. The various support circuits 244 facilitate the operation of the CPU 242 and include one or more clock circuits, power supplies, cache, input/output circuits, and the like. The memory 246 comprises at least one of Read Only Memory (ROM), Random Access Memory (RAM), disk drive storage, optical storage, removable storage and/or the like. In some embodiments, the memory 246 comprises an operating system 248 and a routing module 250. In some embodiments, the processes of the call processing system 240 may be distributed across two or more servers communicatively coupled to one another. In some embodiments, the registration system 252 may be disposed on a single server. In other embodiments, the call processing system 240 and the registration system 252 may each be separate servers communicatively coupled to one another.

The OS 248 generally manages various computer resources (e.g., network resources, file processors, and/or the like). The operating system 248 is configured to execute operations on one or more hardware and/or software modules, such as Network Interface Cards (NICs), hard disks, virtualization layers, firewalls and/or the like. Examples of the operating system 248 may include, but are not limited to, LINUX, MAC OSX, BSD, UNIX, MICROSOFT WINDOWS, IOS, ANDROID and the like.

The networks 206 comprise one or more communication systems that connect computers by wire, cable, fiber optic and/or wireless link facilitated by various types of well-known network elements, such as hubs, switches, routers, and the like. The networks 206 may include an Internet Protocol (IP) network 110, a public switched telephone network (PSTN) 130, or other mobile communication networks listed above, and may employ various well-known protocols to communicate information amongst the network resources.

In a VoIP network, a call request oftentimes takes the form of a Session Initiation Protocol (SIP) INVITE message sent from user A device 202 to a call processing system 240. In a VoIP network, the call processing system 240 may be, for example, a SIP Proxy Network. The details and functionality of SIP can be found in the Internet Engineering Task Force (IETF) Request for Comments (RFC) Paper No. 3261 entitled, "SIP: Session Initiation Protocol" herein incorporated in its entirety by reference.

In practice, when user A wishes to know whether user B is available for a call, user A may send a status request to user B. In some embodiments, user A may select a contact entry associated with user B from a contact list 234 on user A device 202 which automatically checks the status of the user B device 204 responsive to the selection of user B's contact entry in contact list 234. In some embodiments, user A may simply enter or select a telephone number and select, for example, a "Check Status" button, menu item or icon from a user interface. Upon requesting to get the status of user B device 204, the status request module generates a status request message. In attempting to transmit the status request message to user B, the communication module 224 transmits the status request message to call processing system 240 to be routed to user B device 204.

Call processing system 240 (e.g., a SIP Proxy Network) transmits the status request message from user A device 202 to user B device 204. Routing module 250 retrieves an IP address of user B device 204 from the registration system 252. In some embodiments, the status request message is a SIP INVITE message with a special header, however, the message may be any type of message, such as a Hypertext Transfer Protocol (HTTP) message, an Extensible Messaging and Presence Protocol (XMPP) message, and the like that may be transmitted from user A device 202 to user B device 204 using registration system 252 to determine how to route the message. In the case of a SIP INVITE, the special header indicates that the call should not be connected with user B device 204 (i.e., the SIP INVITE should not cause user B device 204 to ring), but rather instructs user B device 204 to retrieve its telephony status. Telephony statuses include, but are not limited to: free, busy (e.g., on call, on call with call waiting, on a GSM (cellular) call), unknown, and the like. The status retrieval module 228 of user B device 204 uses the mobile app 222 and/or OS API calls to determine the telephony status of user B device 204. The communication module 224 transmits the status back to user A device 202, where the status is displayed on display 216.

In some embodiments, if the status of user B device 204 is "busy", the status request is stored in status request log 232. In such embodiments, when the status of user B device 204 changes to free, the notification module 230 sends a message to each device that sent a status request while user B device 204 was busy, indicating that user B device 204 is now free.

In some embodiments, when user B device 204 receives, in response to the status request, an indication that user B device 204 is busy, user A device 202 may be restricted in contacting user B device 204. In such embodiments, when user A device 202 receives an indication that user B device 204 is busy, user A device 202 may be restricted to only sending user B device 204 text messages or making an off-net call to user B. When user A device 202 receives the indication that user B device 204 is free, the restrictions may be lifted, thereby allowing user A device 202 to call user B device 204.

Figure 3:
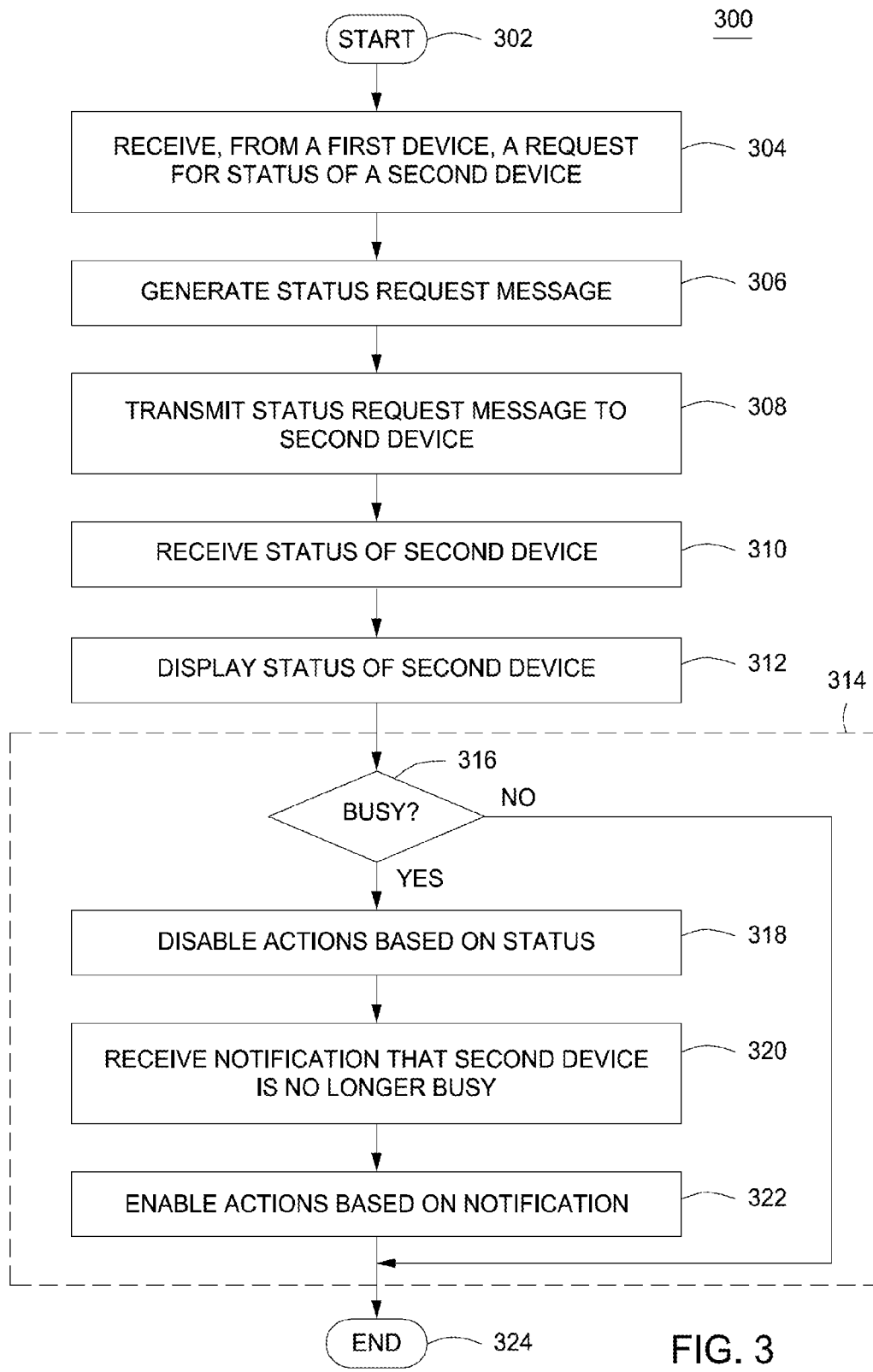
FIG. 3 depicts a flow diagram of a method for determining availability of a user based on mobile device status, according to one or more embodiments of the subject invention.

FIG. 3 depicts a flow diagram of a method 300 for determining availability of a user based on mobile device status, according to one or more embodiments of the subject invention. The method 300 may be executed, for example, on a first device that is checking the status of a second device. The method 300 starts at step 302 and proceeds to step 304.

At step 304, a request is received by a mobile app 222 on the first device. The request is a request to retrieve the telephony status of the second device. In some embodiments, the request may be triggered automatically when a user selects a contact in a contact list. In some embodiments, the request may be triggered when the user manually selects a contact, or enters a telephone number and selects a user interface trigger, for example, a "Check Status" button.

At step 306, the status request module 226 generates a status request message. In some embodiments, the status request message may be a "fake" SIP INVITE message. For example, a fake SIP INVITE message may include a special header that indicates a status request rather than a call request as included in a typical SIP INVITE message. In some embodiments, other types of status request messages may be generated, such as an HTTP or XMPP message, and the like. The status request message instructs the second device to provide a current status of the device, for example, free, busy, status unknown, and the like.

At step 308, the communication module 224 transmits the status request message to the second device. The status request message is sent to a service provider (e.g., a SIP Proxy network) that accesses a registration system in order to determine how to route the status request message to the second device. The second device determines its status and routes a status message back to the first device via the service provider (e.g., SIP Proxy network) as described in further detail with respect to FIG. 4, below.

At step 310, the status of the second device is received at the first device. The notification module 230 parses and displays the telephony status message from the second device and displays the telephony status on display 216. The status message may indicate that the second device is free. The status message may indicate that the second device is busy; meaning the user of the second device is on a call. The status message may indicate that the status is unknown if, for example, the second device is off-line. The method 300 may proceed to step 324 and end.

The method 300 may optionally proceed to block 314. At step 316, it is determined whether the status message received from the second device indicates that the second device is busy. If the status message does not indicate that the second device is busy, the method proceeds to step 324 and ends.

However, if at step 316, it is determined that the status message received from the second device indicates that the second device is busy, then at step 318, the notification module 230 may disable one or more actions. For example, the user of the first device may be restricted to texting the user of the second device or placing an off-net call to the second device, while being unable to place an on-net call to the second device. In some embodiments, the first device may disable/enable all calls based on status of the second device.

At step 320, the notification module 230 receives a message from the second device indicating that the second device is no longer busy. At step 322, the notification module then re-enables the one or more actions disabled at step 318. As such, once the second device is free, the first device may call or send a text to the second device. The method ends at step 324.

Figure 4:
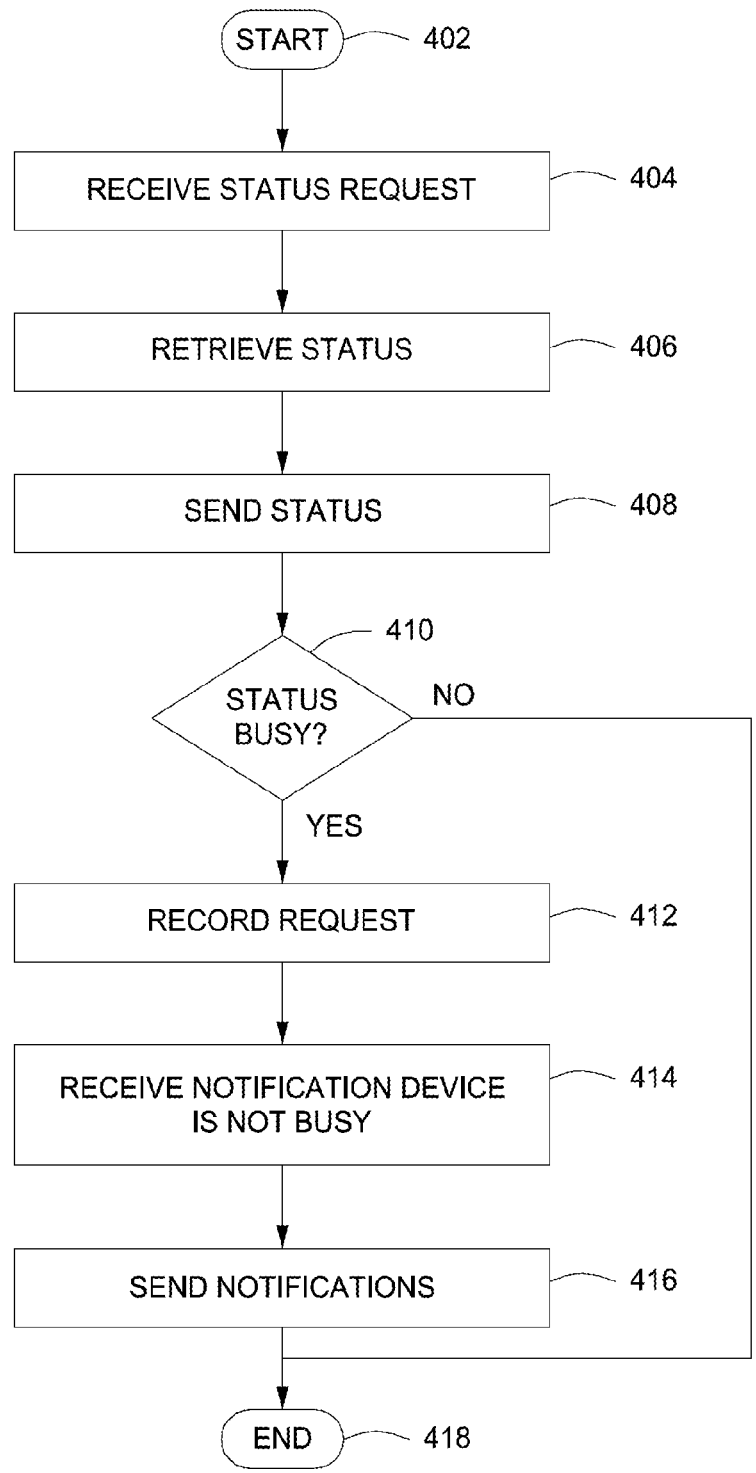
FIG. 4 depicts a flow diagram of a method for responding to a status request, according to one or more embodiments of the subject invention.

FIG. 4 depicts a flow diagram of a method 400 for responding to a status request, according to one or more embodiments of the subject invention. The method 400 may be executed, for example, on a second device where the telephony status of the second device was requested by a first device. The method 400 starts at 402 and proceeds to 404.

At step 404, the mobile app 222 receives a status request. In some embodiments, the status request message is a "fake" SIP INVITE message. The fake SIP INVITE message includes a special header that indicates a status request rather than a call request. In some embodiments, other types of message may be received requesting the device status, such as an HTTP or XMPP message, and the like.

At step 406, the status retrieval module 228 retrieves the telephony status of the device. If a call is in progress using the mobile app 222, the status may be retrieved from the mobile app. If the mobile app is not in use, the telephony status of the device may be retrieved from operating system Application Programming Interfaces (APIs). The retrieved telephony status may be "free", "busy", or "unknown". More specific "busy" telephony statuses may include "in app call" or "cellular call".

At step 408, the retrieved device status is sent back to the first device. The status retrieval module 228 generates a status message which is transmitted to the first device via the communication module 224.

At step 410, it is determined whether the retrieved status is a busy status (i.e., the device is on a call). If the status is not busy, the method 400 proceeds to step 418, where the method ends. However, if at step 410, it is determined that the retrieved status is a busy status, then at step 412 the status request is recorded in, for example, a status request log 232. The status request log 232 is used to record status requests received while the second device is busy. For each status request, an entry in the status request log 232 includes at least an identifier of the initiator of the status request.

At step 414, a notification is received that the status of the device is no longer busy (i.e., the call has ended). As such time, the method 400 proceeds to step 416, where a notification is sent to each identifier in the status request log indicating that the second device is no longer busy. In some embodiments, the notification may be a fake SIP INVITE, a HyperText Transfer Protocol (HTTP) message, UDP message, or any TCP protocol message, such as FTP, SMTP, IMAP, and the like. The notification is sent back to the first device via the service provider (e.g. a SIP Proxy network). In some embodiments, a prompt is provided to the user of the device asking if the user would like to place a call to the device that initiated the status request. The method 400 ends at step 418.

The embodiments of the present invention may be embodied as methods, apparatus, electronic devices, and/or computer program products. Accordingly, the embodiments of the present invention may be embodied in hardware and/or in software (including firmware, resident software, microcode, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example, but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 5:
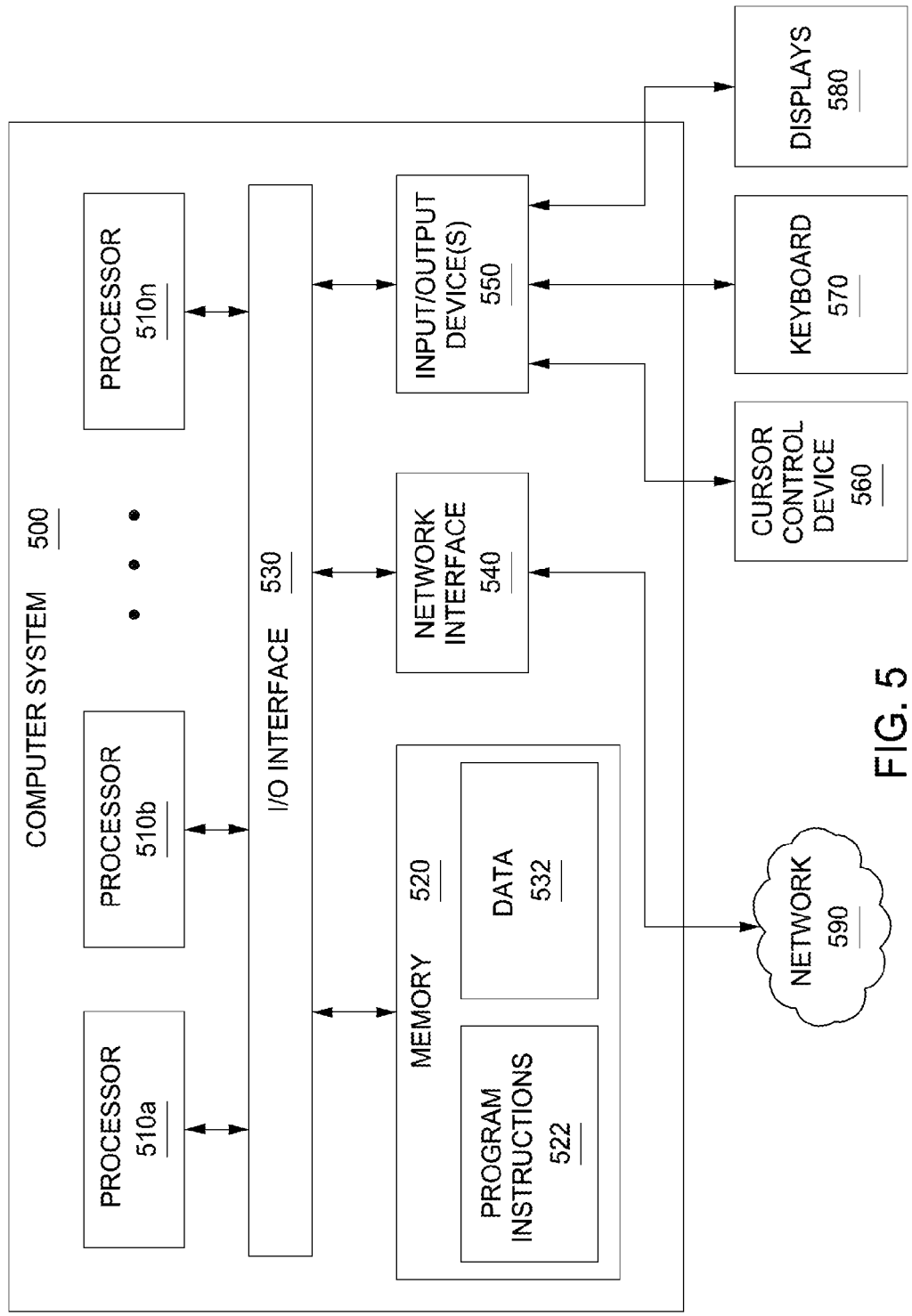
FIG. 5 depicts a computer system that can be utilized in various embodiments of the present invention, according to one or more embodiments of the invention.

FIG. 5 depicts a computer system 500 that can be utilized in various embodiments of the present invention to implement the computer and/or the display, according to one or more embodiments.

Various embodiments of method and apparatus for organizing, displaying and accessing contacts in a contact list, as described herein, may be executed on one or more computer systems, which may interact with various other devices. One such computer system is computer system 500 illustrated by FIG. 5, which may in various embodiments implement any of the elements or functionality illustrated in FIGS. 1-4. In various embodiments, computer system 500 may be configured to implement methods described above. The computer system 500 may be used to implement any other system, device, element, functionality or method of the above-described embodiments. In the illustrated embodiments, computer system 500 may be configured to implement the methods 300 and 400 as processor-executable executable program instructions 522 (e.g., program instructions executable by processor(s) 510) in various embodiments.

In the illustrated embodiment, computer system 500 includes one or more processors 510a-510n coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of the components may be utilized by the system to receive user input described above. In various embodiments, a user interface may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs). In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the operations and methods described above, such as the methods illustrated by the flowcharts of FIG. 3 and FIG. 4. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for determining availability of a user based on mobile device status, comprising:
   receiving, at a first device, an instruction to check a status of a second device;
   transmitting a status request from the first device to the second device;
   receiving, responsive to the status request, a message from the second device indicating a telephony status of the second device;
   disabling, by the first device, an ability of the first device to place a call to the second device when the received telephony status indicates the second device has a call in progress;
   receiving an indication that the second device no longer has a call in progress; and
   enabling the ability to place a call to the second device from the first device.

2. The method of claim 1, further comprising displaying the received telephony status of the second device on a display of the first device.

3. The method of claim 1, wherein if the message indicates that the second device is on a call, receiving thereafter an indication that the second device no longer has a call in progress.

4. The method of claim 3, wherein the indication is one of a Session Initiation Protocol message, a Hyper Text Transfer Protocol message, or an Extensible Messaging and Presence Protocol message.

5. The method of claim 1, wherein the telephony status is one of free, on a call, or unknown.

6. The method of claim 1, wherein the status request is a SIP INVITE message that includes a special header.

7. The method of claim 1, wherein the status of a second device is automatically checked responsive to a selection of a contact associated with the second device.

8. A computer implemented method for providing a mobile device status, comprising:
   receiving a status request from a first device;
   retrieving a telephony status for the mobile device;
   transmitting the telephony status to the first device;
   recording the status request when the telephony status indicates the mobile device is on a call, the status that the mobile device is on a call transmitted to the first device causing the first device to disable an ability of the first device to call the mobile device;
   receiving a notification that the mobile device is no longer on the call; and
   sending a notification to the first device indicating that the mobile device is no longer on the call, the notification that the mobile device is no longer on a call sent to the first device causing the first device to enable the ability of the first device to call the mobile device.

9. A system for determining availability of a user based on mobile device status, comprising:
 a) at least one processor;
 b) at least one input device; and
 c) at least one storage device storing processor-executable instructions which, when executed by the at least one processor, perform a method including:
  receiving, at a first device, an instruction to check a status of a second device;
  transmitting a status request from the first device to the second device;
  receiving, responsive to the status request, a message from the second device indicating a telephony status of the second device, wherein if the message indicates that the second device is on a call, the method further including:
   disabling, by the first device, an ability of the first device to place a call to the second device,
   receiving thereafter an indication that the second device no longer has a call in progress; and
   enabling the ability to place a call to the second device from the first device.

10. The system of claim 9, wherein the method further includes displaying the received telephony status of the second device on a display of the first device.

11. The system of claim 9, wherein the telephony status is one of free, on a call, or unknown.

12. The system of claim 9, wherein the status request is a SIP INVITE message that includes a special header.

13. The system of claim 9, wherein the method further includes automatically checking the status of a second device responsive to a selection of a contact associated with the second device.

14. A system for providing a mobile device status, comprising:
 a) at least one processor;
 b) at least one input device; and
 c) at least one storage device storing processor-executable instructions which, when executed by the at least one processor, perform a method including:
  receiving a status request from a first device and retrieving a telephony status for the mobile device;
  transmitting the telephony status to the first device;
  recording the status request when the telephony status indicates the mobile device is on a call, the status that the mobile device is on a call transmitted to the first device causing the first device to disable an ability of the first device to call the mobile device;
  receiving a notification that the mobile device is no longer on the call; and
  sending a notification to the first device indicating that the mobile device is no longer on the call, the notification that the mobile device is no longer on a call sent to the first device causing the first device to enable the ability of the first device to call the mobile device.

* * * * *